Oct. 5, 1965 S. R. ZEPP 3,210,685

CROSS-COUPLED CRYSTAL-CONTROLLED SQUARE WAVE OSCILLATOR

Filed April 25, 1962

INVENTOR
S. R. ZEPP
BY Lucian C. Canepa
ATTORNEY

United States Patent Office 3,210,685
Patented Oct. 5, 1965

3,210,685
CROSS-COUPLED CRYSTAL-CONTROLLED SQUARE WAVE OSCILLATOR

Stanley R. Zepp, Red Bank, N.J., assignor to Bell Telephone Laboratories, Incorporated, New York, N.Y., a corporation of New York Filed Apr. 25, 1962, Ser. No. 190,015
8 Claims. (Cl. 331—47)

Figure 1:
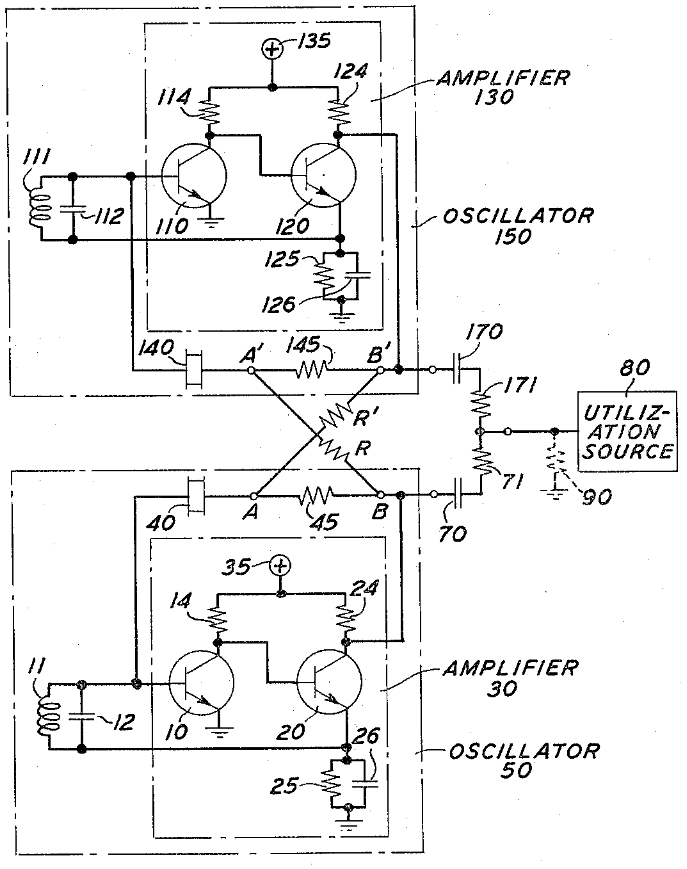

This invention relates to oscillators and, more specifically, to cross-coupled, crystal-controlled oscillators generating square wave output voltages.

Sinusoidal oscillators are among the oldest circuit arrangements found in the electronics art. Various well known embodiments, often referred to by the proper names of the inventors, include the Hartley, Colpitz and Pierce oscillators. Others, such as the tuned-plate, tuned-grid and tickler feedback oscillators derive their nomenclature from the type of feedback they employ. All the above-identified oscillating circuits, plus the remainder of the class of circuits which may properly be called sinusoidal oscillators, may simply and succinctly be described as feedback circuits with a loop gain and phase shift which approximate unity and 360°, respectively.

In addition to sinusoidal generators, square wave oscillating circuits are well known, perhaps the most common of which is the astable multivibrator. This type of arrangement, however, relies upon both passive and active circuit elements, which change value with aging, to establish the circuit timing reference. These circuits are therefore inherently less stable, for example, than a crystal-controlled sinusoidal oscillator of the Pierce type wherein the crystal frequency changes only slightly with aging.

In addition to frequency stability, various oscillators employed in critical or sensitive applications require a plurality of redundant oscillators to provide an output if any of the individual circuits should fail. One pair of oscillators employed to accomplish this function heterodyne their output voltages thereby producing a difference signal representative of the variance in their output frequencies. The difference signal is utilized to bring the two oscillators back into synchronization. This arrangement suffers a dual disadvantage of requiring extensive additional circuitry and also of producing a relatively poor phase synchronization. Other prior art arrangements characteristically use one master oscillator and a second, dependent slave oscillator whose frequency is controlled by the master. However, there is no synchronizing energy supplied by the slave to the master oscillator.

It is an object of the present invention to supply a highly reliable oscillating circuit.

More specifically, it is an object of the present invention to provide a pair of crystal-controlled oscillators which are locked together in phase and frequency.

Another object of the present invention is the provision of a crystal-controlled oscillator arrangement supplying a square wave output signal.

A further object of the present invention is the provision of an oscillating arrangement which supplies an output signal independent of the failure of any circuit component.

These and other objects of the present invention are realized in a specific illustrative oscillator circuit employing a pair of cross-coupled oscillators, each including a low phase shift, high gain, negative feedback, direct-current amplifier. A series resonant crystal is connected between the input and output terminals of each amplifier thereby providing an oscillating mode at approximately the resonant frequency of the crystal. The loop gain of each oscillator is made much greater than unity to overdrive the amplifier and provide a square wave output voltage, rather than a sinusoid.

A resistive network, employed to cross couple the two oscillators, includes a plurality of relatively low-valued resistors connecting each of the oscillator amplifier output terminals with each of the crystals. Hence, the output of each oscillator amplifier supplies the feedback circuit of both oscillators with synchronization energy, thereby locking the two circuits in phase and frequency. If any single component, or if a plurality of circuit elements in one oscillator should fail, the remaining oscillator circuit supplies a continuous output signal.

An output utilization device is connected to the output terminals of both oscillator amplifiers through a summing circuit or, alternatively, an OR logic gate, both of which supply a signal if both or either of the individual oscillators are functioning.

It is, thus, a feature of the present invention that a highly reliable oscillator arrangement include two individual oscillating circuits each of which supplies synchronizing energy to the feedback circuit of the other oscillator.

It is another feature of the present invention that an oscillator include a loop gain which is much greater than unity thereby overdriving a gain-producing element and generating a square wave output voltage.

It is yet another feature of the present invention that a pair of cross-coupled oscillators each include a high gain, low phase shift, negative feedback, direct-current amplifier, a series resonant crystal interconnecting the output and input terminals of each of the amplifiers, and that a lattice network be included between the amplifier output terminals and the crystals contained in the oscillators.

Figure 2A:
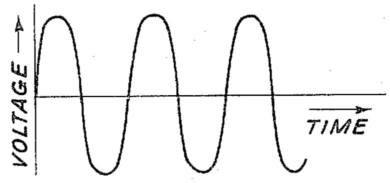
Figure 2B:
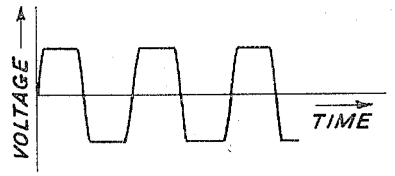

A complete understanding of the present invention and of the above and other features, variations and advantages thereof may be gained from a consideration of the following detailed description of a crystal-controlled, cross-coupled oscillating circuit presented hereinbelow in connection with the accompanying drawing, in which:

FIG. 1 is a schematic diagram of a specific illustrative cross-coupled oscillator which embodies the principles of the present invention;

FIG. 2A is a time plot of the sinusoidal voltage which appears at the base of each of the transistors 10 and 110 illustrated in FIG. 1; and FIG. 2B is a time plot of the voltage appearing at the collector terminal of each of the transistors 20 and 120 illustrated in FIG. 1.

Referring now to FIG. 1, there is shown a specific illustrative, cross-coupled oscillator arrangement containing two individual self-contained oscillators 50 and 150. Included in the oscillator 50 is a high gain, low phase shift, negative feedback amplifier 30 comprising two transistors 10 and 20 along with their associated collector impedances 14 and 24. A resistor 25 and a capacitor 26 connected in parallel therewith are serially connected to the emitter of the transistor 20. A parallel resonant circuit including an inductor 11 and a capacitor 12 are connected between the base of the transistor 10 and the emitter of the transistor 20. This parallel resonant circuit, along with the resistor 25, supplies stabilizing negative feedback to the transistors 10 and 20 at relatively low frequencies.

As may readily be observed, a signal injected at the base of the transistor 10 undergoes a 180° phase shift in the grounded emitter stage 10 followed by another 180° shift in the transistor 20 thereby producing little phase shift between the base of the transistor 10 and the collector of the transistor 20. A series resonant crystal 40 is serially connected to a relatively small resistor 45, and the series combination is inserted between the base of the transistor 10 and the collector of the transistor 20.

The effect of the resistor 45 will be considered hereinafter.

The forward gain of the transistor amplifier 30 is designed to greatly exceed the transmission, filtering loss of the crystal 40 at the crystal's resonant frequency thereby providing a loop gain which greatly exceeds unity. Also, the crystal 40 introduces a negligible phase shift at its series resonant frequency thereby providing the oscillator 50 with a loop phase shift which is approximately 360°, or 0° which is equivalent thereto. These two conditions, viz., a loop gain exceeding unity and a phase shift of 360°, thus satisfy the well known Nyquist requirement for oscillation. However, as the loop gain has been made much greater than unity rather than approximating unity, the magnitude of the oscillator output signal increases without bounds until the transistor 20 is alternately driven between saturation and cutoff. This nonlinear transistor operation produces a square wave type of voltage waveform at the collector of the transistor 20, illustrated in FIG. 2B, rather than the sinusoidal voltage normally expected of a crystal oscillator. The voltage fed back to the base of transistor 10, however, is sinusoidal in nature as illustrated in FIG. 2A. The crystal 40 will not pass the square wave as it blocks all the frequency components contained therein except for the crystal's series resonant frequency and harmonics thereof. These upper harmonics, however, are essentially shunted to ground by the capacitor 12 included in the parallel resonant circuit and the capacitor 26, both of which exhibit relatively low impedances at the harmonic frequencies.

The parallel resonant circuit comprising the elements 11 and 12 is tuned slightly above the crystal resonant frequency to be thereby somewhat inductive at the crystal frequency. The inductive nature of the tank circuit will offset any slight phase lag which is introduced into the circuit by the delay of transistor 20 when it is driven out of saturation. The resonant circuit thus eliminates the necessity for the crystal 40 to operate off its resonant frequency to thereby cancel this phase lag.

The second oscillator 150 is identical in every respect to the oscillator 50 described hereinabove. The corresponding components thereof are identically numbered except that they are increased by 100. For example, the transistor 110 in the oscillator 150 corresponds to the transistor 10 of the oscillator 50, and so forth.

Attention will now be directed to the resistors 45 and 145 contained in the oscillators 50 and 150, respectively, along with the resistors R and R′ associated therewith. The resistors R and R′ are connected between the collectors of the transistors 20 and 120 and the crystals 140 and 40 of the opposite oscillators, respectively. These four resistors are all of a relatively low magnitude and form a lattice network between the oscillator output terminals and the crystals contained in the oscillators. By making all four resistors of approximately the same magnitude, the output of the oscillator 50 supplies as much synchronizing feedback energy to the input terminal of the oscillator 150 through the resistor R and the crystal 140, as it does to the base of the transistor 10 through the resistor 45 and the crystal 40. The output of the transistor 120 is similarly connected. As the inserted resistors are relatively small, they do not produce an appreciable reduction in the loop gain of either oscillator.

The energy interchanged between the two oscillators by means of the resistor lattice network is sufficient to lock the two in phase and frequency. In practice, two oscillators have been locked together in phase and frequency even though the crystals employed deviated in their resonant frequencies by as much as 100 cycles. This roughly corresponds to the frequency change encountered due to the lifetime aging of a crystal.

Additionally, the above-described circuit arrangement will advantageously supply an output voltage independent of the failure of any single component failure. Assume, for example, that the transistor 20 for some reason failed to conduct. This would have absolutely no deleterious effect on the oscillator 150 which would continue to generate a square wave output at the collector of the transistor 120. Even if the transistor 20 should for some reason present a direct short circuit between its collector and ground, this would still not stop oscillations in the oscillator 150 as the resistor R would present a sufficient impedance between the crystal 140 and ground to satisfactorily maintain the loop gain of oscillator 150 well above unity. Similarly, no other single component failure nor any plurality of failures in one of the oscillators 50 or 150, could interrupt the outputs of both oscillators concurrently.

Two capacitors 70 and 170, serially connected to resistors 71 and 171, respectively, connect the collectors of the transistors 20 and 120 to a utilization device 80 which presents an input resistance 90 to ground. The resistors 171, 71 and 90 form a well known adder circuit such that the utilization device 80 is supplied with a square wave input if either one or both of the oscillators 50 and 150 are functioning. Should one of the oscillators fail to supply an output, the square wave voltage supplied to the utilization device 80 would be continuous, but its magnitude would, of course, be diminished by one-half. Alternatively, the resistors 71 and 171 may be replaced by an OR logic gate thereby assuring that a square wave voltage possessing a constant amplitude would be supplied to the utilization device 80 even if one of the oscillators failed to supply an output.

It is to be understood that the above-described arrangements are only illustrative of the application of the present invention. Numerous other arrangements may be devised by those skilled in the art without departing from the spirit and scope of the present invention. For example, the two-stage amplifiers including the transistors 10 and 20, or 110 and 120, may be replaced by any low phase shift, high gain amplifying arrangement including, for example, a grounded base, point contact transistor circuit.

What is claimed is:

1. In combination in a locked oscillator pair, first and second low phase shift amplifier means, an input and output terminal included in each of said amplifier means, two two-terminal series resonant crystals, one terminal of each of said crystals connected to a different one of said amplifier input terminals, a cross-coupling network including a plurality of equal-valued lattice-arranged resistors interconnecting each of said amplifier output terminals with the second terminal of each of said crystals, and common output means connected between the output terminals of said amplifier means.

2. A combination as in claim 1 further including two parallel resonant circuits respectively connected between the input terminals of said first and second amplifier means and a point of reference potential.

3. A combination as in claim 2 wherein each of said amplifier means is characterized by a forward gain $k$, where $k$ is any positive number, wherein said series-resonant crystal is characterized by a transmission loss $m$, where $m$ is any positive number greatly exceeded by $k$.

4. A combination as in claim 3 wherein each of said parallel resonant circuits is characterized by a resonant frequency $f_1$, where $f_1$ is any postive number, and said series-resonant crystal is characterized by a resonant frequency $f_0$, where $f_0$ is any positive number slightly less than $f_1$.

5. An oscillator comprising a high gain, low phase shift amplifier means including input and output terminals, a series resonant crystal connected between said amplifier input and output terminals, a parallel resonant circuit including first and second terminals, and means conductive to direct current included in said amplifier means for supplying negative feedback to said first terminal of said parallel resonant circuit, said second terminal of said parallel resonant circuit being connected to said amplifier input terminal.

6. A combination as in claim 5 further including an additional oscillator identical to said first oscillator, and a plurality of equal-valued lattice-arranged resistors interconnecting each of said amplifier output terminals with each of said crystals.

7. A combination as in claim 6 further including common output means connected to the output of terminals of said oscillator amplifier means for supplying any alternating current signals present thereat.

8. A combination as in claim 6, wherein each of said amplifier means comprises first and second transistors each including base, emitter and collector terminals, said collector terminal of said first transistor connected to said base terminal of said second transistor, a voltage source, two resistors respectively connecting said collector terminals to said voltage source, said parallel resonant circuit connected between said base terminal of said first transistor and said emitter terminal of said second transistor, said emitter terminal of said first transistor being connected to a point of reference potential, a resistor and a capacitor connected in parallel therewith serially connected between said second transistor emitter terminal and said point of reference potential.

References Cited by the Examiner

UNITED STATES PATENTS

| | | | |
|---|---|---|---|
| 2,303,862 | 12/42 | Peterson | 331—159 |
| 2,625,650 | 1/53 | Spencer | 331—159 X |
| 2,903,650 | 9/59 | Glomb | 331—56 |
| 2,960,666 | 11/60 | Brewster et al. | 331—116 |
| 2,980,865 | 4/61 | Hilbourne | 331—116 |

FOREIGN PATENTS

| | | |
|---|---|---|
| 428,581 | 5/35 | Great Britain. |

OTHER REFERENCES

Beyer, D. S.: "Portable Transistor Frequency Standard," in Electronics, pages 194, 196. June 1, 1957.

ROY LAKE, *Primary Examiner.*

JOHN KOMINSKI, *Examiner.*